United States Patent
Galdrikian

(10) Patent No.: US 9,928,644 B2
(45) Date of Patent: Mar. 27, 2018

(54) METHOD AND APPARATUS FOR DETERMINING MUTUAL INTERSECTION OF MULTIPLE CONVEX SHAPES

(71) Applicant: NVIDIA Corporation, Santa Clara, CA (US)

(72) Inventor: Bryan Galdrikian, South Pasadena, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 29 days.

(21) Appl. No.: 14/789,896

(22) Filed: Jul. 1, 2015

(65) Prior Publication Data

US 2016/0019712 A1 Jan. 21, 2016

Related U.S. Application Data

(60) Provisional application No. 62/019,833, filed on Jul. 1, 2014.

(51) Int. Cl.
*G06T 17/10* (2006.01)

(52) U.S. Cl.
CPC .......... *G06T 17/10* (2013.01); *G06T 2210/21* (2013.01)

(58) Field of Classification Search
None
See application file for complete search history.

(56) References Cited

U.S. PATENT DOCUMENTS

| | | | | |
|---|---|---|---|---|
| 5,943,056 A | * | 8/1999 | Sato | G06T 17/00 345/419 |
| 6,285,805 B1 | * | 9/2001 | Gueziec | G06T 7/60 382/299 |
| 9,058,678 B1 | * | 6/2015 | Le Grand | G06T 15/005 |
| 2004/0088146 A1 | * | 5/2004 | Forest | G06T 17/00 703/2 |
| 2005/0203930 A1 | * | 9/2005 | Bukowski | G06F 17/30241 |
| 2007/0262987 A1 | * | 11/2007 | Ahn | G06T 17/00 345/424 |

(Continued)

OTHER PUBLICATIONS

Culley, R., and K. Kempf. "A collision detection algorithm based on velocity and distance bounds." Robotics and Automation. Proceedings. 1986 IEEE International Conference on. vol. 3. IEEE, 1986.*

(Continued)

*Primary Examiner* — Ryan M Gray

(57) ABSTRACT

A solution is proposed for efficiently determining whether or not a set of elements (such as convex shapes) in a multi-dimensional space mutually intersects. The solution may be applied to elements in any closed subset of real numbers for any number of spatial dimensions of the multi-dimensional space. The solutions provided herein include iterative processes for calculating the point displacement from boundaries of the elements (shapes), and devices for implementing the iterative process(es). The processes and devices herein may be extended to abstract (functional) definitions of convex shapes, allowing for simple and economical representations. As an embodiment of the present invention, an object called a "void simplex" may be determined, allowing the process to terminate even earlier when found, thereby avoiding unnecessary computation without excess memory requirements.

18 Claims, 6 Drawing Sheets

(56) References Cited

U.S. PATENT DOCUMENTS

2013/0235047 A1* 9/2013 Xia .................. G06T 13/40
 345/474
2014/0244635 A1* 8/2014 Hu .................... G06F 17/3087
 707/724

OTHER PUBLICATIONS

Cameron, Stephen. "Collision detection by four-dimensional intersection testing." IEEE Transactions on Robotics and Automation 6.3 (1990): 291-302.*
Hubbard, Philip Martyn. "Collision detection for interactive graphics applications." IEEE Transactions on Visualization and Computer Graphics 1.3 (1995): 218-230.*

* cited by examiner

METHOD AND APPARATUS FOR DETERMINING MUTUAL INTERSECTION OF MULTIPLE CONVEX SHAPES

RELATED APPLICATIONS

This application claims the benefit of U.S. provisional application No. 62/019,833, entitled "The Void Simplex Method, A New Method To Test For Mutual Intersection Of Half-Spaces" to Bryan Galdrikian, and filed on Jul. 1, 2014.

BACKGROUND OF THE INVENTION

In the field of graphics processing, computational geometry is a critical discipline used to represent objects and object motion (via simulation). In addition to computer graphics and computer-aided design and manufacturing, other applications of computational geometry include the fields of robotics, geographic information systems (GIS), integrated circuit design, computer-aided engineering (CAE), and computer vision. One aspect common to almost every application of computational geometry is the detection of object collisions, particularly in physics simulations.

A central challenge facing these applications is to perform this detection as efficiently as possible, with good scaling behavior, and without requiring any more data than necessary. Two popular approaches to this challenge may be characterized as Linear Programming, and Convex Proximity Algorithms.

With respect to linear programming approaches, the computing resources (e.g., memory space and time) required to perform typical approaches scale exponentially with the number of elements, which can be prohibitive when the number of elements becomes large. Moreover, linear programming solutions typically are completely incapable handling input sets of an infinite or indefinite size. With respect to Convex Proximity Algorithms, these approaches are typically limited to two convex shapes. For convex polytopes with a finite number of faces, additional boundary data must be determined (and thus calculated), thereby requiring inefficient extra processing (or memory) overhead before the process can even be performed.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

An aspect of the present invention proposes a solution for determining whether or not the intersection of a set of elements (e.g., convex shapes) in a multi-dimensional coordinate space of real numbers is empty. The solution can be used to detect object collisions, e.g., in simulated environments. According to one or more embodiments, a process is described that may be implemented iteratively, using an input of a set of elements in any number of dimensions of a coordinate space, and a target point in the space. These elements may comprise, for example, half-spaces, defined by corresponding hyperplane boundaries. In one or more embodiments, the input set of elements may include the hyperplane boundary equations.

According to one or more embodiments, a current search point is created (initially set to be equal to the target point). The hyperplanes in the input set are searched to find the hyperplane with the greatest signed distance from the search point. If the search point is contained by all hyperplanes (thus, if the distance is 0 or appreciably 0), the presence of an intersection is determined, and the process outputs the presence of the intersection (e.g., as a Boolean output). Otherwise, the hyperplane just discovered in the search is added to the subset. Then, the intersection of the half-spaces bounded by the hyperplanes in the subset is determined. If the intersection is empty or does not exist, (e.g., the half-spaces are mutually disjoint) the process likewise terminates to output the absence of a mutual intersection. If neither of these states can be determined, a subsequent iteration is performed by replacing the current search point with a new search point in the intersection of the half-spaces that was closest to the target point. The hyperplanes in the subset that do not contain the updated search point are removed, and the process is repeated by determining the hyperplane from the input set with the greatest signed distance from the (new) search point.

The final output of the process (e.g., an absence or presence of a mutual intersection) can be used to determine when an object collision occurs. According to such embodiments, objects may be represented as convex shapes comprising a plurality of half-spaces. A collision may be determined when a mutual intersection is determined between the hyperplanes that bound the half-spaces of multiple convex shapes. Alternately, collisions may be avoided when a mutual intersection is determined to be absent between the hyperplanes corresponding to multiple convex shapes. In one or more embodiments, not only does the solution described above determine whether the elements in the input set have a mutual intersection, the process also determines, when a mutual intersection exists, the point in the intersection closest to the initial target point.

According to another aspect of the present invention, a solution is proposed to implement the iterative process in a processor of a computing device, and/or as programmed instructions on a computer readable medium, which when executed by a processor of a computing device, is operable to perform the iterative process. In one or more embodiments, the processor may comprise a graphics processing unit (GPU), a central processing unit (CPU), or any other application specific integrated circuit that performs computation and processing.

According to yet another aspect of the invention, an absence of a mutual intersection for D+1 or fewer hyperplanes (where D is the number of dimensions in a given coordinate space) is defined herein as a "void simplex." According to one or more embodiments, a set of half-spaces that has no mutual intersection is determined to include a subset which is a void simplex.

According to one or more embodiments, the solution proposed herein may be implemented as a computational geometry tool for use in collision physics (such as collision detection) for physics simulation, constructive solid geometry for physics and graphics geometry, and for visibility graph generation performed during graphical rendering.

BRIEF DESCRIPTION OF THE DRAWINGS

The accompanying drawings are incorporated in and form a part of this specification. The drawings illustrate embodiments. Together with the description, the drawings serve to explain the principles of the embodiments.

DETAILED DESCRIPTION

Figure 1:
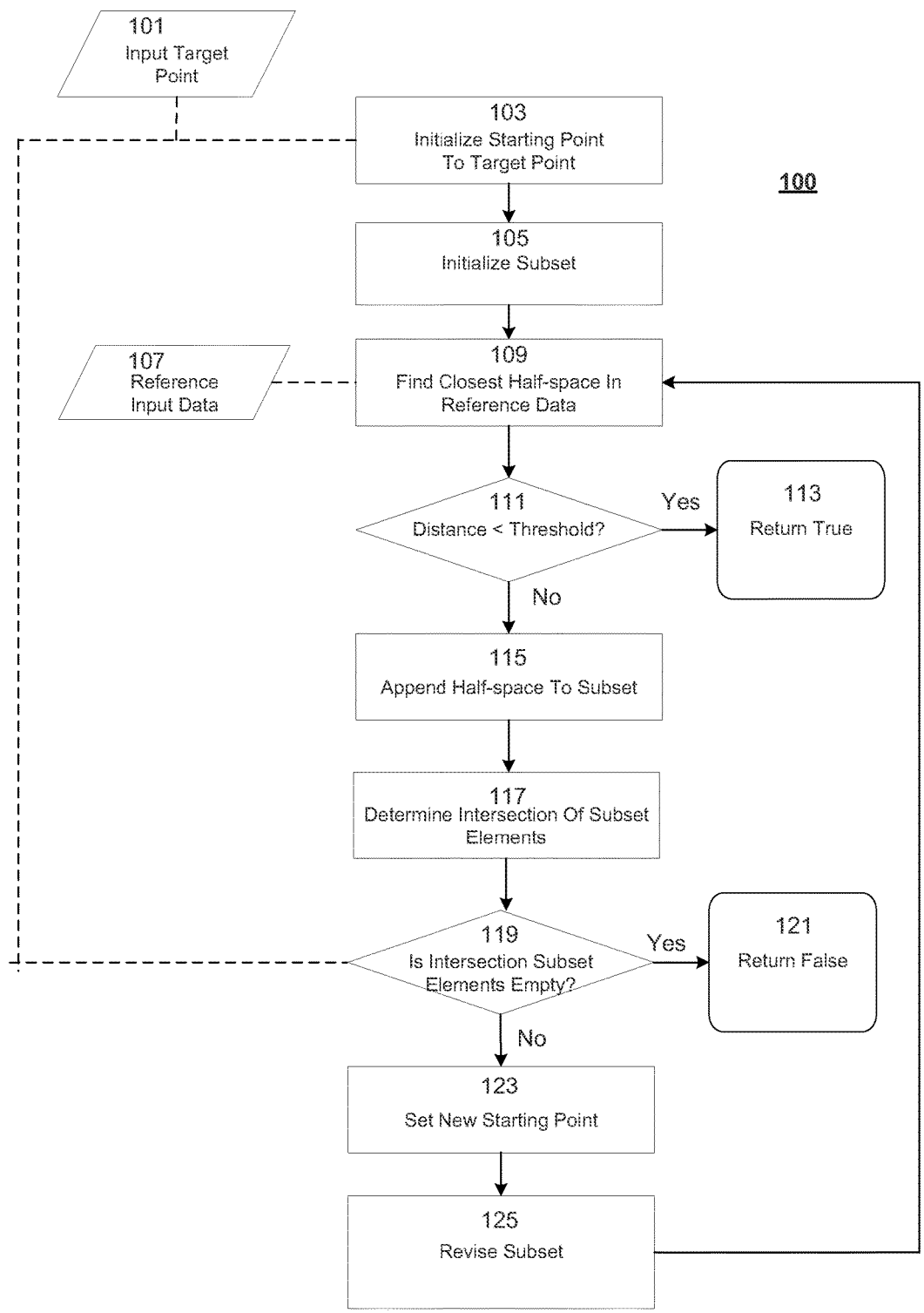
FIG. 1 depicts a flowchart of an exemplary process for determining whether of elements in a coordinate space has a mutual intersection, in accordance with various aspects of the present invention.

Reference will now be made in detail to the preferred embodiments of the claimed subject matter, a method and system for the use of a radiographic system, examples of which are illustrated in the accompanying drawings. While the claimed subject matter will be described in conjunction with the preferred embodiments, it will be understood that they are not intended to limit these embodiments. On the contrary, the claimed subject matter is intended to cover alternatives, modifications and equivalents, which may be included within the spirit and scope as defined by the appended claims.

Furthermore, in the following detailed descriptions of embodiments of the claimed subject matter, numerous specific details are set forth in order to provide a thorough understanding of the claimed subject matter. However, it will be recognized by one of ordinary skill in the art that the claimed subject matter may be practiced without these specific details. In other instances, well known methods, procedures, components, and circuits have not been described in detail as not to obscure unnecessarily aspects of the claimed subject matter.

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer generated step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present claimed subject matter, discussions utilizing terms such as "storing," "creating," "protecting," "receiving," "encrypting," "decrypting," "destroying," or the like, refer to the action and processes of a computer system or integrated circuit, or similar electronic computing device, including an embedded system, that manipulates and transforms data represented as physical (electronic) quantities within the computer system's registers and memories into other data similarly represented as physical quantities within the computer system memories or registers or other such information storage, transmission or display devices.

Detection of Mutual Intersections

Embodiments of the claimed subject matter are presented to provide a novel solution for efficiently determining whether or not a set of elements (such as convex shapes) in a multi-dimensional space mutually intersects. The solution may be applied to elements in any closed subset of real numbers for any number of spatial dimensions of the multi-dimensional space. The solutions provided herein include iterative processes for calculating the point displacement from boundaries of the elements (shapes), and devices for implementing the iterative process(es). The processes and devices herein may be extended to abstract (functional) definitions of convex shapes, allowing for simple and economical representations. As an embodiment of the present invention, an object called a "void simplex" may be determined, allowing the process to terminate even earlier when found, thereby avoiding unnecessary computation without excess memory requirements.

FIG. 1 depicts a flowchart of an exemplary computer implemented process 100 for determining whether (or not) a set of elements in a coordinate space has a mutual intersection, in accordance with embodiments of the present invention. Steps 101-125 describe the steps comprising the process depicted in the flowchart 100 of FIG. 1.

The process 100 begins by receiving or otherwise accessing an input target point (t) at step 101. The input target may be determined from a function, or user-supplied, for example. In one or more embodiments, the input target point may correspond to a point in a multi-dimensional space for which an intersection (or collision) may be determined. At step 103, a search point (x) in the process is initiated by setting the search point to the input target point (e.g., x=t).

At step 105, an initial subset (S) is initialized. The subset S is used, for example, to store elements that correspond to the state of the iterative portion of the process (beginning in step 109), and may be initialized by setting the subset to empty. A set of elements (H) in the multi-dimensional coordinate space is then received (or accessed) as an input at step 107. Steps 101 to 107 represent the initialization of the process and, according to one or more embodiments, are performed once for each execution/instantiation.

In one or more embodiments, the set of elements may comprise a set of half-spaces, and the input received may consist of boundary definitions (e.g., equations) for hyperplanes that comprise the boundaries of the set of half-spaces. The set of elements may represent one or more convex shapes or other graphical objects. For embodiments wherein the set of elements comprise half-spaces, convex shapes may be represented as the intersections of a subset of half-spaces. In one or more embodiments, the shapes may be of any convex, closed subset of points in a real vector space of any number of dimensions, with boundaries defined by both flat and curved surfaces, either bounded or unbounded.

According to one or more embodiments, the input list can include an effectively infinite number of convex shapes without affecting the scaling of resource requirements to perform the process. The list may be defined for example, by a user-supplied function or a list provided in memory. During the process, a subset of hyperplanes is maintained reflective of the current state of iterations. According to one or more embodiments, the size of the subset of hyperplanes is always limited to the number of dimensions in the space plus one, even for an infinite set of elements, thereby reducing the memory requirements.

In one or more embodiments, the subset S may be initialized as an empty set, and during the iterative process will hold a a number of hyperplanes from the set of elements H that is no greater than one plus D (the number of dimensions in the multi-dimensional coordinate space). At step 109, the half-space h in the input set of elements H with the greatest signed difference (e.g., as a half-space maximal) from the search point (equal to the target point during the first iteration) is determined. In one or more embodiments, step 109 may be performed by, for example, implementing a function that returns a hyperplane tangent which the maximal signed distance to the search point. The half-space h with the greatest signed difference (maximal) to the search point is then compared to a (pre-determined) threshold at step 111.

If the distance is equal to or below the pre-determined threshold (as determined step 111), the search point is determined to be within the half-space. Since the half-space h is the furthest half-space from the search point, such a result indicates that the search point is common to all half-spaces in the input set H, and thus, a mutual intersection exists, in which the search point is a member of. In one or more embodiments, the pre-determined threshold may be zero, or substantially close to zero for representing floating point numbers.

If the current search point is determined to be in all half-spaces of the input set, the process proceeds to step 113, where the presence of a mutual intersection (and thus possible collision) is confirmed and output. As a result of the operations performed in the process 100, the search point is also the nearest point in a mutual intersection (if one exists) to the target point received or accessed in step 101, and the output is updated to include this information (specifically, that the search point is the closest point in the mutual intersection to the target point).

If, however, the distance between h (determined at step 109) and the search point is greater than the threshold (as determined at step 111), the subset S is revised to include the half-space h at step 115. At step 117, a mutual intersection of the elements in the subset S (revised in step 115) is determined to be empty, an absence of a mutual intersection in the elements of input set H is confirmed and output as such at step 121.

If the mutual intersection of the half-spaces represented by the elements in S is non empty (as determined in step 119), a new search point is selected at step 123. In one or more embodiments, the new search point is selected as the closest point in the mutual intersection to the input target point t. At step 125, the subset S is revised by removing the elements in S that do not include the new search point in its boundary (hyperplane). Once step 125 is completed, steps 109 through 125 are iteratively repeated until an output (at either step 113 or 121) is reached.

The final output of the process—such as the presence (from step 113) or absence (from step 121) of a mutual intersection, and the closest point in any intersection to the input target point—can be used to determine when an object collision occurs, and where the collision occurs. According to such embodiments, objects in the may be represented as convex shapes comprising a plurality of half-spaces, and the input data received or accessed in step 101 may include the hyperplanes that define the half-spaces for the convex shapes. A collision may be subsequently detected when a mutual intersection is determined between the hyperplanes that bound the half-spaces of multiple convex shapes. Alternately, collisions are deemed to be avoided when a mutual intersection is determined to be absent between the hyperplanes corresponding to multiple convex shapes. The entire process described thusly can be performed and repeated during processing (e.g., by a computer processor such as a graphics processing unit) of graphical data and/or physics modeling and simulation applications.

Figure 2A:
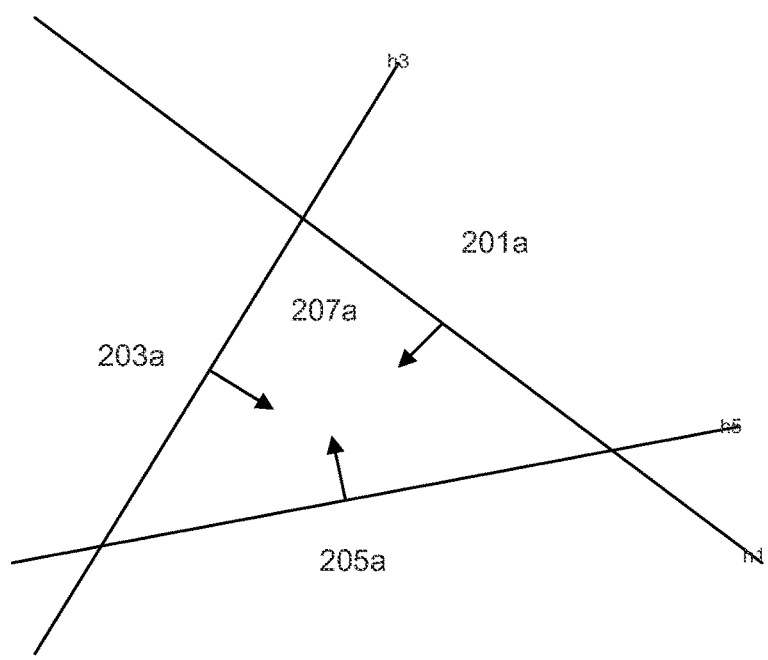
FIG. 2a is a diagram that depicts an absence of mutual intersections ("void simplex") between three half-spaces of an exemplary two dimensional space, in accordance with various aspects of the present invention.

FIG. 2a depicts an absence of mutual intersections ("void simplex") between three half-spaces of an exemplary two dimensional space. As presented in FIG. 2a, the three half-spaces (e.g., half-spaces 201a, 201b, 201c) are each bounded by a hyperplane (e.g., half-space 201a is bounded by hyperplane h1, half-space 203a is bounded by hyperplane h3, and half-space 205a is bounded by hyperplane h5). As depicted in FIG. 2a, each half-space extends in the opposite direction from the normal of the corresponding hyperplane (directed inwards). While each of the half-spaces have hyperplanes that intersect (separately) the hyperplanes of the other half-spaces in the coordinate space, no mutual intersection of all three half-spaces (via their bounding hyperplanes or otherwise) exist. The absence of such a mutual intersection is identified as a void simplex (identified as the region 207a).

According to one or more embodiments of the invention, the absence of a mutual intersection—or alternately, the presence of a void simplex (e.g., region 207a)—may be determined in the iterative process described above with respect to FIG. 1 that can be performed efficiently over coordinate spaces of a multitude of dimensions.

Figure 2B:
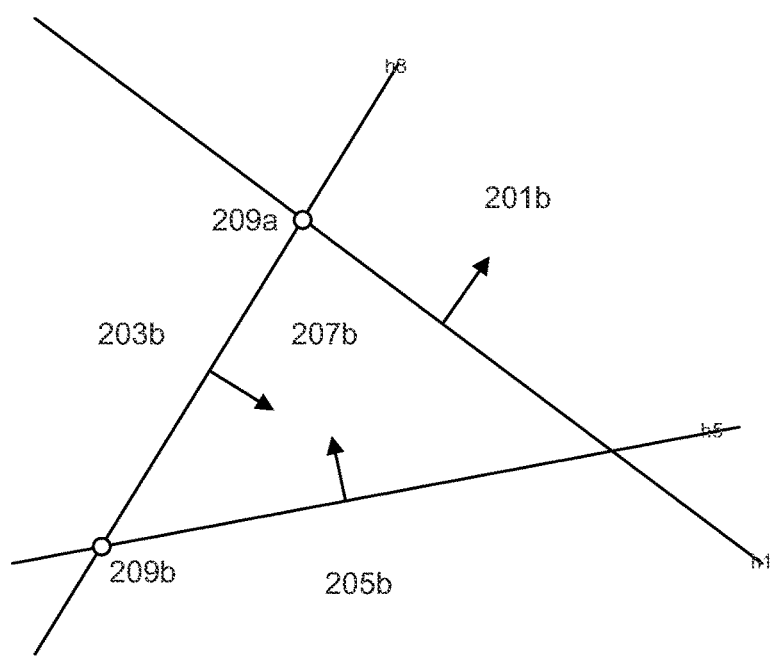
FIG. 2b is a diagram that depicts an exemplary two dimensional space during an iteration of the proposed method for determining the presence of a mutual intersection, in accordance with various aspects of the present invention.

FIG. 2b depicts an exemplary two-dimensional space during an iteration of the proposed method for determining the presence of a mutual intersection. As depicted in FIG. 2b, the previous search point —created by selecting the intersection of hyperplanes h1 and h3 and corresponding to half-spaces 201b and 203b—is replaced with the next or current search point (209b) by replacing the hyperplane h1 of 201b with the hyperplane h5 of 205b.

Figure 3A:
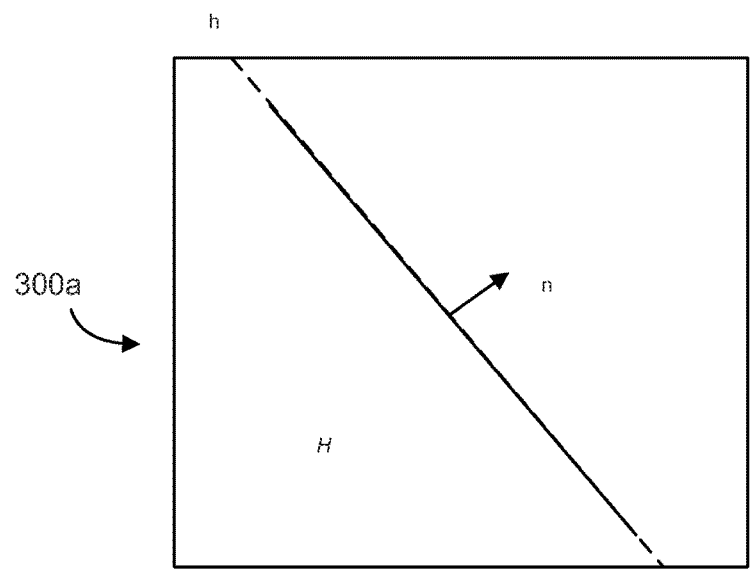
FIG. 3a is a diagram that depicts an exemplary half-space in a two dimensional coordinate space, in accordance with various embodiments of the present invention.

FIG. 3a depicts an exemplary half-space in a two dimensional coordinate space 300a. As shown in FIG. 3a, a half space H is bounded by a hyperplane h, with normal a normal vector n. In an embodiment, half-spaces are closed, such that hyperplane h is a subsection of half-space H. According to one or more embodiments, the hyperplane normal (e.g., n) is outward-pointing relative to the corresponding half-space (e.g., H).

Figure 3B:
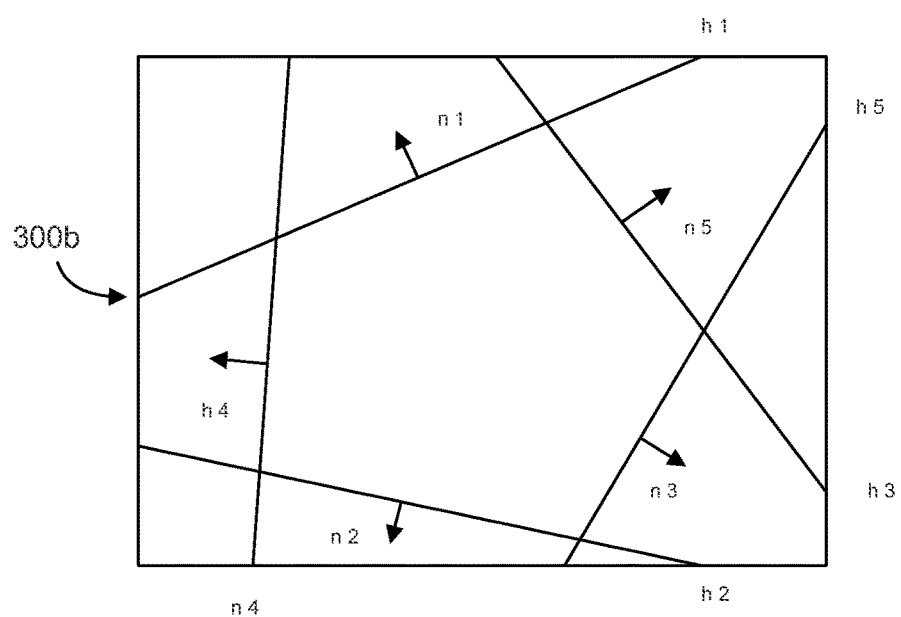
FIG. 3b is a diagram that depicts an exemplary convex shape as the intersection of a plurality of half-spaces in a two dimensional coordinate-space, in accordance with various embodiments of the present invention.

FIG. 3b depicts an exemplary convex shape as the intersection of a plurality of half-spaces in a two dimensional coordinate-space 300b. As described above, half-spaces may be defined by their respective hyperplane boundaries. The union of the half-spaces corresponding to hyperplanes h1, h2, h3, h4, and h5 (and opposite normals n1, n2, n3, n4, and n5) form the polygon 300b.

According to yet another aspect of the invention, an absence of a mutual intersection for D+1 or fewer hyperplanes (where D is the number of dimensions in a given coordinate space) is defined herein as a "void simplex." According to one or more embodiments, a set of half-spaces that has no mutual intersection is determined to include a subset which is a void simplex. A void simplex is a projective simplex or "P(D) simplex," where D is the number of spatial dimensions. As described herein, a simplex is a (D+1) sided polytope in D number of dimensions, and is equal to Shape (S) for some set S consisting of D+1 half-space vectors.

Figure 4:
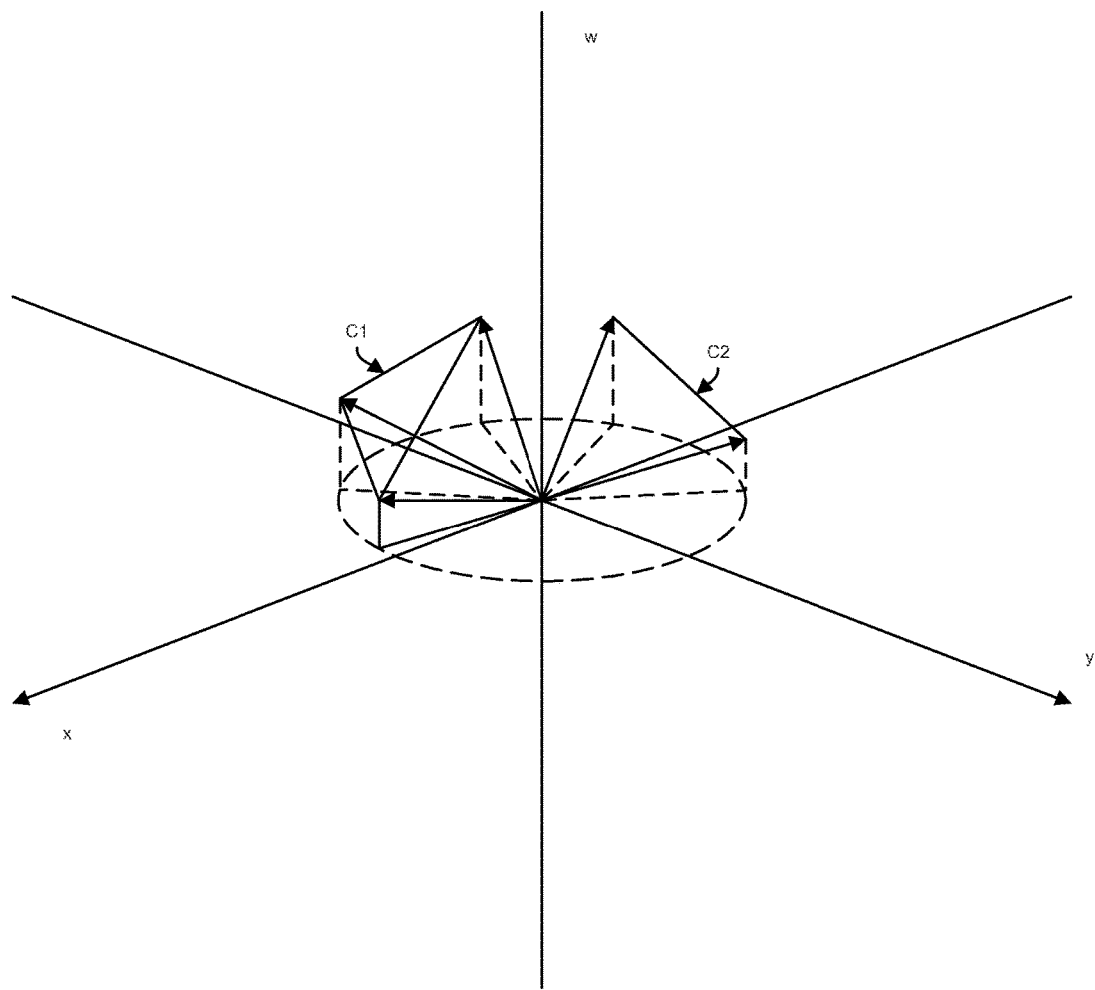
FIG. 4 is a diagram that depicts exemplary projective (P) simplices in a multi-dimensional space of projective coordinates, in accordance with various embodiments of the present invention.

As defined herein, a void simplex is a P-simplex for which there is no shape (Shape S=0). According to one or more embodiments, given a set of half-space vectors H as input, if some subset of H is a void simplex, then Shape H=0, and conversely, if Shape H=0, there must be some subset of H that is a void simplex. FIG. 4 depicts exemplary projective (P) simplices in a multi-dimensional space of projective coordinates.

As shown in FIG. 4, two P(2)-simplices (C1 and C2) are presented in a three-dimensional space. In one or more embodiments, half-space vectors comprise the points in the three-dimensional space. The first dimensional components are the normal vector of the half-space bounding plane, which is normalized. According to such embodiments, the vectors lie on a unit cylinder aligned with the third axis. The plane displacement is the vector's w coordinate. As depicted in FIG. 4, the P(2) simplex C1 is "full" when it contains three half-space vectors, and the convex hull of the vector endpoints is a triangle. The other simplex C2 consists of two half-space vectors, and the corresponding convex hull is a line segment.

Figure 5A:
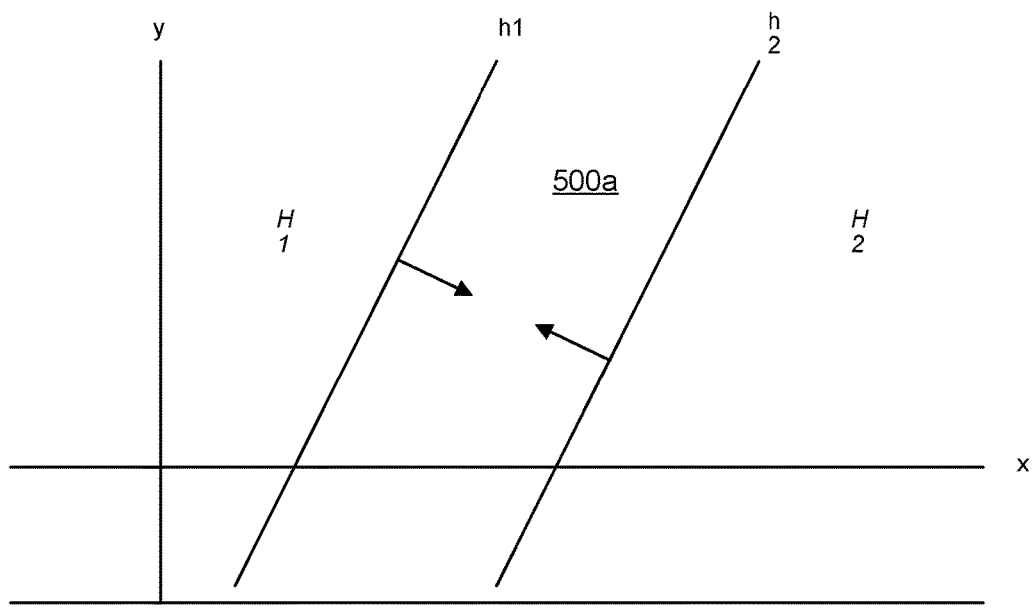
FIG. 5a is a diagram that depicts an exemplary void simplex in multiple dimensions, in accordance with various embodiments of the present invention.

FIG. 5a depicts an exemplary void simplex 500a in multiple dimensions. As presented in FIG. 5a, two half-spaces (H1, H2) with corresponding bounding hyperplanes h1 and h2 are included. When the bounding plane normals oppose each other as shown, a void simplex is formed so the intersection of the half-spaces is empty.

Figure 5B:
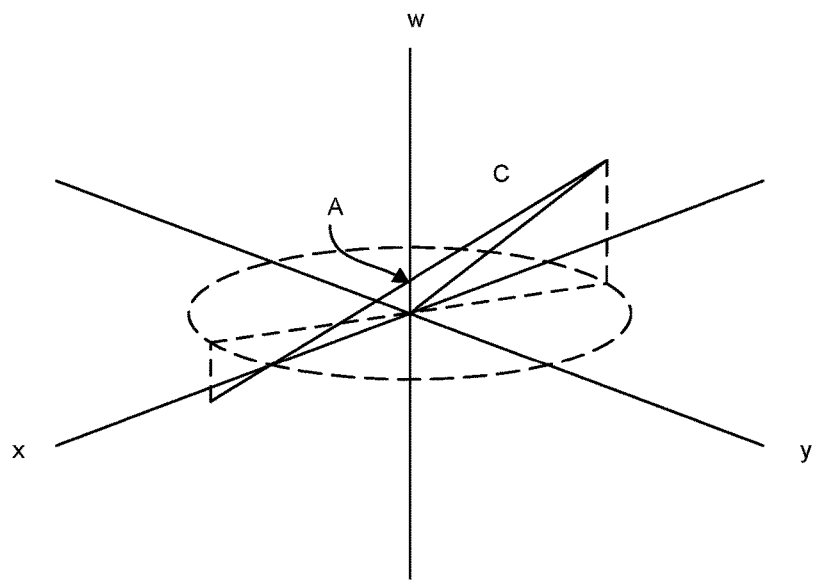
FIG. 5b is a diagram that depicts an exemplary void simplex in projective coordinates, in accordance with various embodiments of the present invention.

FIG. 5b depicts the exemplary void simplex of FIG. 5a in projective coordinates. As presented in FIG. 5b, the same arrangement that appears in FIG. 5a is represented in projective (P(3)) coordinates. The convex hull of the vector endpoints of the bounding hyperplanes is the line segment C, which intersects the third (w) axis at the point labeled A. Since A has a positive value in w, a void simplex is therefore determined.

Exemplary Computing System

Figure 6:
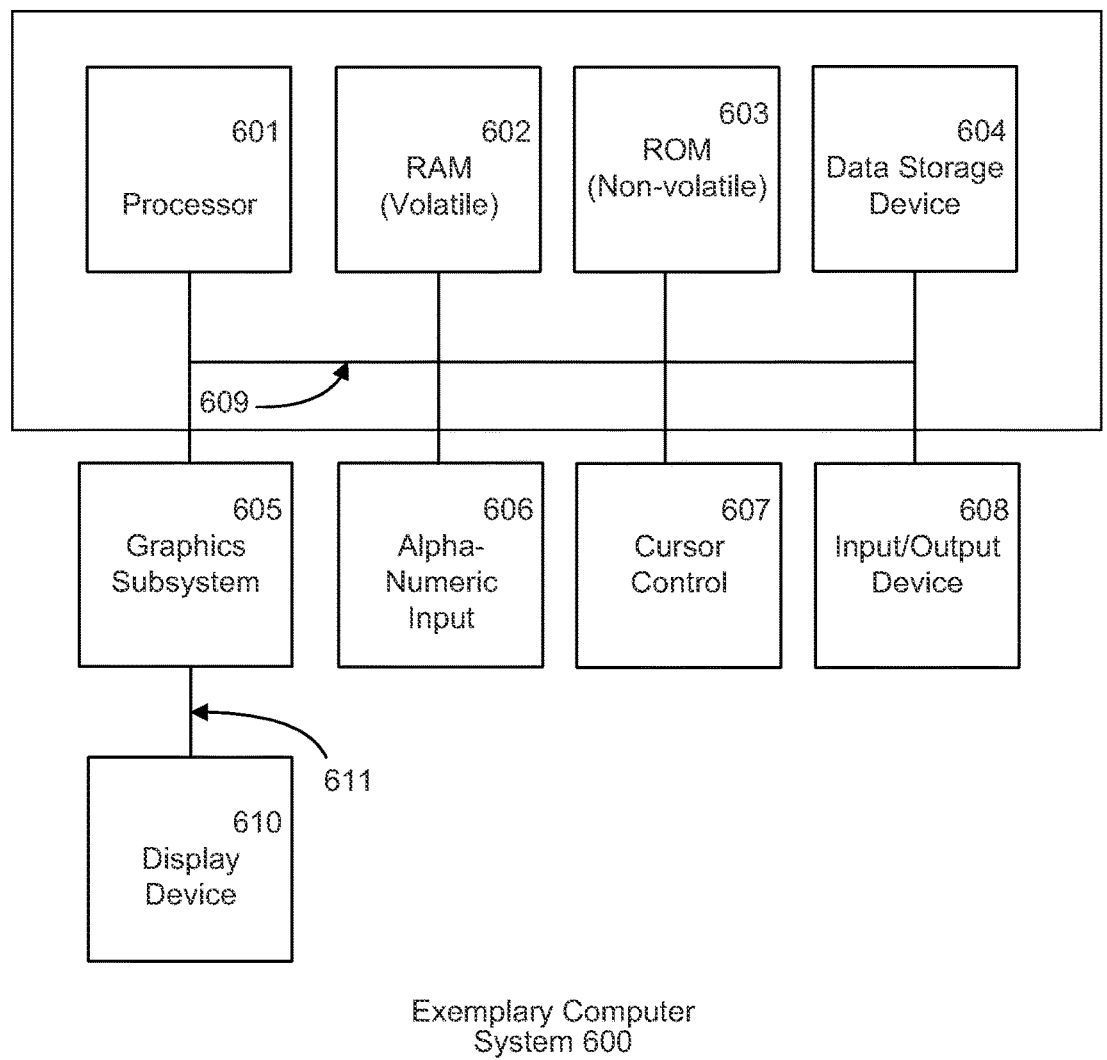
FIG. 6 is a diagram that depicts an exemplary computing system, in accordance with embodiments of the present invention.

As presented in FIG. 6, an exemplary computer system 600 upon which embodiments of the present invention may be implemented (such as the process 100 described above) includes a general-purpose computing system environment. In its most basic configuration, computing system 600 typically includes at least one processing unit 601 and memory, and an address/data bus 609 (or other interface) for communicating information. Depending on the exact configuration and type of computing system environment, memory may be volatile (such as RAM 602), non-volatile (such as ROM 603, flash memory, etc.) or some combination of the two.

Computer system 600 may also comprise an optional graphics subsystem 605 for presenting information to the computer user, e.g., by displaying information on an attached display device 610. In one embodiment, the processing of object collisions and physics simulation, and the generation of visibility graphs for graphics rendering may be performed, in whole or in part, by graphics subsystem 605 in conjunction with the processor 601 and memory 602, with any resulting output displayed in attached display device 610.

Additionally, computing system 600 may also have additional features/functionality. For example, computing system 600 may also include additional storage (removable and/or non-removable) including, but not limited to, magnetic or optical disks or tape. Such additional storage is illustrated in FIG. 6 by data storage device 607. Computer storage media includes volatile and nonvolatile, removable and non-removable media implemented in any method or technology for storage of information such as computer readable instructions, data structures, program modules or other data. RAM 602, ROM 603, and data storage device 607 are all examples of computer storage media.

Computer system 600 also comprises an optional alphanumeric input device 606, an optional cursor control or directing device 607, and one or more signal communication interfaces (input/output devices, e.g., a network interface card) 609. Optional alphanumeric input device 606 can communicate information and command selections to central processor 601. Optional cursor control or directing device 607 is coupled to bus 609 for communicating user input information and command selections to central processor 601. Signal communication interface (input/output device) 609, also coupled to bus 609, can be a serial port. Communication interface 609 may also include wireless communication mechanisms. Using communication interface 609, computer system 600 can be communicatively coupled to other computer systems over a communication network such as the Internet or an intranet (e.g., a local area network), or can receive data (e.g., a digital television signal).

Embodiments described herein provide a new approach for multiple convex shape intersection testing. Advantages of the invention described herein provide for finite sets of half-spaces, nearly linear scaling behavior that scales well with the number of half-spaces and dimensions in both quantities, even when the number of half-spaces is large. According to the embodiments described herein, intersection testing in physical simulations can be performed succinctly, using simple representations of convex volumes. Relative to conventional approaches, the approach proposed herein performs intersection or feasibility in exponentially less time, while requiring significantly less memory in instances with large numbers of half-spaces.

In one or more embodiments, the solutions proposed herein are performed by testing only a subset of a (effectively) infinite number of elements in a multi-dimensional coordinate space for a mutual intersection. The subset itself never contains more than one plus the number of dimensions in the space. According to further embodiments, the memory requirements of the solutions proposed herein scale to be consistent with the square of the number of dimensions times the memory required for the number of elements. For implementations on a finite number of elements, the process completes (on average) in linear time that corresponds to the number of elements.

In the foregoing specification, embodiments have been described with reference to numerous specific details that may vary from implementation to implementation. Thus, the sole and exclusive indicator of what is the invention, and is intended by the applicant to be the invention, is the set of claims that issue from this application, in the specific form in which such claims issue, including any subsequent correction. Hence, no limitation, element, property, feature, advantage, or attribute that is not expressly recited in a claim should limit the scope of such claim in any way. Accordingly, the specification and drawings are to be regarded in an illustrative rather than a restrictive sense.

What is claimed is:

1. A method for determining object-collisions in coordinate space, the method comprising:
   i) receiving an input target point and a set of data comprising a plurality of elements representing a plurality of objects in a coordinate space;
   ii) initializing a search point and a subset of elements from the set of data;
   iii) determining, from the set of data, at least one element from the plurality of elements with the largest signed distance from the search point;
   iv) comparing the distance to a threshold; and
   v) verifying a presence of a mutual intersection between elements of the set of data when the distance is equal to or less than the threshold; and
   when the distance is greater than the threshold:
   vi) appending the at least one element to the subset;
   vii) determining an intersection of the elements in the subset;
   viii) creating a new search point based on the intersection of the elements in the subset;
   ix) revising the subset based on the new search point; and
   x) iteratively repeating steps iii)-ix) with new search point.

2. The method according to claim 1, wherein the set of data comprises a plurality of half-spaces, and an element of the set of data comprises a half-space.

3. The method according to claim 2, wherein the plurality of half-spaces comprise a number of half-spaces equal to one more than a number of dimensions comprised by the multi-dimensional coordinate space.

4. The method according to claim 3, wherein the subset of elements comprises a plurality of hyperplanes corresponding to the plurality of half-spaces.

5. The method according to claim 1, wherein the subset of elements comprises a plurality of hyperplanes, further wherein viii) creating a new search point comprises:
   determining an intersection of the elements in the subset, and
   determining the closest point in the intersection of the hyperplanes represented by the elements of the subset to the target point.

6. The method according to claim 5, wherein determining an intersection of the elements in the subset further comprises verifying an absence of a mutual intersection of the plurality of elements when the intersection of the elements in the subset is empty.

7. The method according to claim 1, wherein the new search point comprises a point in an intersection of a plurality of half-spaces corresponding to the subset of elements with the least distance from the input target point.

8. The method according to claim 1, wherein revising the subset based on the new search point comprises removing an element from the subset that does not include the new search point as a boundary.

9. The method according to claim 1, further comprising:
   xi) determining a collision between the plurality of objects based on the presence of the intersection.

10. The method according to claim 1, wherein the threshold is a floating point number with an approximate value of 0.

11. The method according to claim 1, wherein an object of the plurality of objects comprises one or more convex shapes.

12. A device for determining object-collisions in coordinate space, the device comprising:
   a memory operable to store a set of data comprising a plurality of elements representing a plurality of objects in a coordinate space;
   a processor communicatively coupled to the memory and operable to reference the set of data to perform the operations of:
   i) receiving an input target point and a set of data comprising a plurality of elements representing a plurality of objects in a coordinate space;
   ii) initializing a search point and a subset of elements from the set of data;
   iii) determining, from the set of data, at least one element from the plurality of elements with the largest signed distance from the search point;
   iv) comparing the distance to a threshold; and
   v) verifying a presence of a mutual intersection between elements of the set of data when the distance is equal to or less than the threshold; and
   when the distance is greater than the threshold:
   vi) appending the at least one element to the subset;
   vii) determining an intersection of the elements in the subset;
   viii) creating a new search point based on the intersection of the elements in the subset;
   ix) revising the subset based on the new search point; and
   x) iteratively repeating steps iii)-ix) with the new search point.

13. The device according to claim 12, wherein verifying an absence of a mutual intersection comprises verifying the presence of a void simplex.

14. The device according to claim 12, wherein the new search point comprises a point closest to the search point that is an intersection of a plurality of hyperplanes corresponding to the subset of elements.

15. The device according to claim 12, wherein the set of data comprises a plurality of half-spaces, and an element of the set of data comprises a half-space.

16. The device according to claim 15, wherein the plurality of half-spaces comprise a number of half-spaces equal to one more than a number of dimensions comprised by the multi-dimensional coordinate space.

17. The device according to claim 16, wherein the subset of elements comprises a plurality of hyperplanes corresponding to the plurality of half-spaces.

18. A non-transitory computer readable medium comprising a plurality of programmed instructions, which, when executed by a processor of a computing system, is operable to perform object collision detection, the non-transitory computer readable medium comprising:
   i) instructions to receive an input target point and a set of data comprising a plurality of elements representing a plurality of objects in a coordinate space;
   ii) instructions to initialize a search point and a subset of elements from the set of data;

iii) instructions to determine, from the set of data, at least one element from the plurality of elements with the largest signed distance from the search point;
iv) instructions to compare the distance to a threshold; and
v) instructions to verify a presence of a mutual intersection between elements of the set of data when the distance is equal to or less than the threshold; and when the distance is greater than the threshold:
  vi) instructions to append the at least one element to the subset;
  vii) instructions to determine an intersection of the elements in the subset;
  viii) instructions to create a new search point based on the intersection of the elements in the subset;
  ix) instructions to revise the subset based on the new search point; and
  x) instructions to iteratively repeat steps iii)-ix) with new search point.

\* \* \* \* \*